Nov. 2, 1965
H. W. DEATON
3,215,818
TEMPERATURE CONTROL ELECTRIC CIRCUIT
Filed April 29, 1963
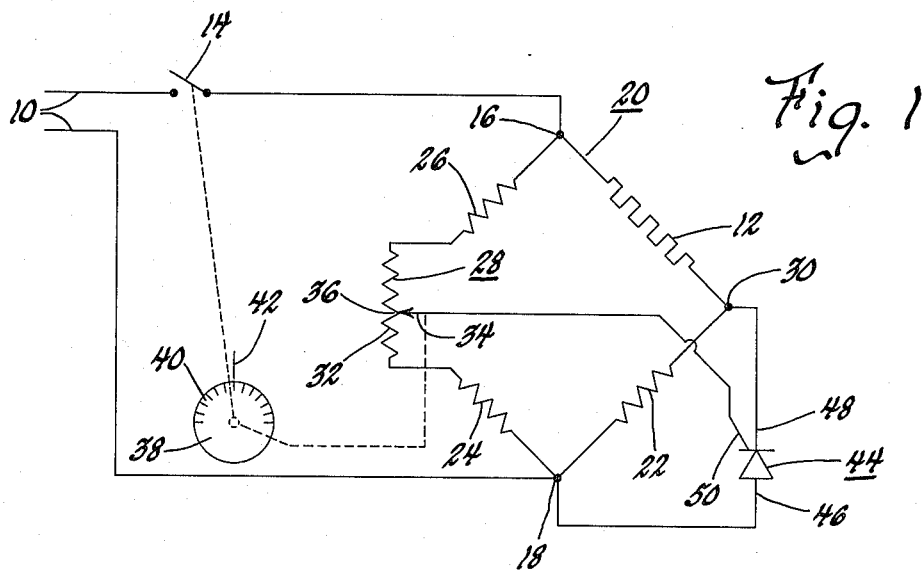
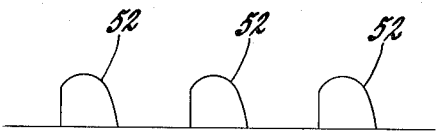
INVENTOR.
Homer W. Deaton
BY
J.C. Evans
HIS ATTORNEY

# United States Patent Office 3,215,818
Patented Nov. 2, 1965

3,215,818
TEMPERATURE CONTROL ELECTRIC CIRCUIT
Homer W. Deaton, Dayton, Ohio, assignor to General Motors Corporation, Detroit, Mich., a corporation of Delaware
Filed Apr. 29, 1963, Ser. No. 276,583
8 Claims. (Cl. 219—499)

This invention relates to a control circuit for controlling the energization of an electrical heater in a kitchen range or the like.

Many electrical heater control stystems include means for anticipating the temperature of an object heated by the heater to de-energize the heater before the object reaches a set temperature. In such cases the residual heat in the heater continues to raise the temperature of the object until it reaches the set temperature. Such anticipation prevents the temperature of the object from overshooting the set temperature, but it also creates the problem of increasing the time required to reach the set temperature.

One object of the present invention, therefore, is to provide improved means for rapidly heating and controlling the temperature of an object in heat transfer relationship with a surface heating element of an electrical range or the like to prevent the object from being overheated.

A further object of the invention is to provide improved means for controlling the temperature of a heating element by varying the energization thereof in accordance with variations in the electrical resistance thereof.

A still further object of the invention is to provide means for controlling the temperature of a surface heating element including means for sensing changes in the electrical resistance of the surface heating element that generate a signal for actuating a semiconductor for controlling energization of the surface heating element in response to changes in the electrical resistance thereof.

Further objects and advantages of the present invention will be apparent from the following description, reference being had to the accompanying drawings wherein a preferred embodiment of the present invention is clearly shown.

In the drawings:

FIGURE 1 is a schematic wiring diagram of an electrical control system for regulating the temperature of a heating element of an electrical range or the like;

FIGURE 2 schematically shows the wave form energizing the heating element controlled by the system in FIGURE 1.

Referring now to FIGURE 1 of the drawings, reference numeral 10 designates the power supply lines through which a suitable source of domestic power, such as 118 volt A.C., is supplied to a heating element 12 having a positive temperature coefficient of resistance, for example, a Nichrome resistance coil of an electrical range tubular sheathed cooking unit.

Upon closing a main line switch 14, A.C. power is supplied to the heating element 12 through input terminals 16, 18 of a plural path Wheatstone bridge circuit, generally designated by the reference numeral 20, that includes the heating element. The Wheatstone bridge 20, more particularly, includes a plurality of resistances 22, 24, 26 having a substantially zero temperature coefficient of resistance and a potentiometer 28 which are arranged in circuit with the heating element 12 to pass a controlled amount of current therethrough during the A.C. cycle for generating an output signal from the bridge that varies in accordance with the resistance value of the heating element 12 as produced by variations in the temperature thereof.

The resistor 22 is serially arranged with the heating element 12 across the lines 10 and the bridge arms that include the heating element 12 and the resistor 22 are connected at a first output terminal 30. The potentiometer 28 includes a resistance element 32 having a substantially zero temperature coefficient of resistance that is serially arranged with resistors 24 and 26 across the power lines 10 and also includes an electrical contact carrying arm 34 contacting the resistor 32 at a second output terminal 36. The arm 34 is moved relative to the resistor 32 by a rotatable knob 38 having a scale 40 thereon calibrated in a suitable manner such as in degrees Fahrenheit of temperature with the scale 40 being movable with respect to a pointer 42 for indicating a temperature selected by rotating the dial 40. The dial 40 can serve as the means for opening and closing the main line switch 14 in adition to varying the resistance in the bridge circuit 20 between the power source and the output terminal 36 thereof.

The improved circuit further includes a three-terminal semiconductor element 44, for example, a silicon-controlled rectifier element. For purposes of the following discussion, the semiconductor element will be referred to as an SCR. Input and output terminals 46, 48 of the SCR 44 are connected to the output terminal 30 and one of the power lines 10, respectively, and the gate or control terminal 50 of the SCR 44 is connected to the other output terminal 36 through the movable contact arm 34. The illustrated SCR 44 acts as an ON-OFF switch for energizing the heater element 12 under the control of the output signal from the output terminals 30, 36 of the bridge 20. More particularly, the SCR is characterized by the fact that it only conducts during the positive phase of the A.C. cycle with the period of conduction being initiated when a bridge output signal of a predetermined value occurs across the gate and output terminals 50, 48 and being terminated upon reversal of polarity across the circuit produced when the A.C. cycle enters its negative phase. In other words, the SCR 44 conducts current as a half-wave form of the type illustrated at 52 is FIGURE 2 with the period during which the SCR conducts during each positive phase of the A.C. cycle being determined by the occurrence of a predetermined output signal from the bridge 20.

By virtue of the above-described circuit, the heating element 12 and objects being heated thereby can be controlled through an infinite range of preselected temperatures by rotating the dial 38 from an OFF position to a predetermined desired temperature value on the scale 40. This establishes a preselected reference or control voltage $V_1$ at the output terminal 36. When the switch 14 is initially closed, the heating element 12 is cold and a second voltage $V_2$ at the output terminal 30 is relatively low so that an output signal is generated by the bridge circuit 20 that will trigger the SCR 44 relatively early in the positive phases of the A.C. cycle. The temperature of the heating element 12 rapidly increases and the resistance value thereof correspondingly increases to reduce the voltage $V_2$ at the output terminal 30 so that the output signal from the bridge circuit 30 continually decreases with the SCR 44 being triggered at progressively later periods in each positive phase of the A.C. cycle. When the heating element 12 attains the temperature set by dial 38 the resistance value thereof establishes a voltage $V_2$ that in combination with the reference or control voltage $V_1$ maintains the output signal at a level below that required to trigger the SCR 44 and the heating element 12 is, accordingly, de-energized until the resistance value thereof is reduced when the temperature of the heating element falls below the temperature selected by the dial 38 to a point where the output signal from the bridge 20 will again trigger the SCR 44.

In accordance with certain of the principles of the present invention, the progressive reduction of the energization of the heating element 12 produced by the output signal from the bridge 20 prevents the heating element 12 and an object in heat transfer relationship therewith from overshooting the temperature preselected by the dial 38 even though the heating element 12 rapidly approaches the set temperature. If it is desired to change the controlled temperature of the heating element 12, a user merely has to move the dial 38 to a new rotative position thereby causing a greater or lesser portion of the potentiometer resistor 32 to be located between the power source and the output terminal 36. This causes a change in the control or reference voltage $V_1$ so that variations in the voltage $V_2$ produced by changes in the resistance in the heating element 12 during the temperature increase thereof will reduce the output signal from the bridge 20 to a point where it will no longer trigger the SCR 44 at either increased or decreased temperatures of the heating element 12, depending upon the temperature selected by the dial 38.

While the above-described circuit only includes a half-wave form energizing heating element 12, it will be appreciated that a second SCR can be provided in the circuit for providing a full-wave energization of the heating element 12 with one of the SCR's firing during the positive phase of the A.C. cycle and the other of the SCR's firing during the negative phase of the A.C. cycle under the control of the output signal from the bridge 20.

While the embodiment of the present invention as herein disclosed constitutes a preferred form, it is to be understood that other forms might be adopted.

What is claimed is as follows:

1. A temperature controller comprising bridge circuit means adapted to be connected to a source of A.C. power including an electrical surface heating element as one of its legs for sensing the resistance of said heating element, said bridge circuit means producing a control signal corresponding to the resistance of said surface heating element, means for energizing said surface heating element in response to said control signal including semi-conductor means having first and second terminals serially connected with said heating element across said power source and having the second terminal and a third terminal thereof connected across said bridge to receive the control signal therefrom for controlling current flow through said heating element in accordance with the temperature thereof.

2. A temperature controller comprising bridge circuit means adapted to be connected to a source of A.C. power including an electrical surface heating element as one of its legs for sensing the resistance of said heating element, said bridge circuit means producing a control signal corresponding to the resistance of said surface heating element, means for energizing said surface heating element in response to said control signal including a silicon-controlled rectifier having input and output terminals thereof serially connected with said heating element across said power source and having the output terminal and a gate terminal thereof connected across said bridge to receive the control signal therefrom for controlling current flow through said heating element in accordance with the temperature thereof.

3. A temperature controller comprising a bridge circuit having first, second, third and fourth resistances, said resistances having the ends thereof connected to form first, second, third and fourth junctions, said fourth resistance serving as a heating element having a positive temperature coefficient of resistance, said first and third junctions adapted to be connected across a source of A.C. voltage, said bridge circuit establishing a control voltage across said second and fourth junctions in accordance with the resistance value of said fourth resistance, semi-conductor means connected across said second and fourth junctions actuatable in response to said control voltage, said semi-conductor means conducting current during only a portion of the cycle of the A.C. input voltage across said bridge circuit as determined by the control voltage across said second and fourth junctions during which periods the first resistance is by-passed and the full input voltage is imposed across said fourth resistance for increasing the temperature thereof toward a first predetermined value under the control of said bridge circuit.

4. A temperature controller comprising a bridge circuit having first, second, third and fourth resistances, said resistances having the ends thereof connected to form first, second, third and fourth junctions, said fourth resistance serving as a heating element having a positive temperature coefficient of resistance, said first and third junctions adapted to be connected across a source of A.C. voltage, said bridge circuit establishing a control voltage across said second and fourth junctions in accordance with the resistance value of said fourth resistance, a pair of silicon-controlled rectifiers connected across said second and fourth junctions actuatable in response to said control voltage, said one of said silicon-controlled rectifiers conducting current during the positive phase cycles of the A.C. input voltage across said bridge circuit and the other of said silicon controlled rectifiers conducting current during the negative phase of the cycles of the A.C. input durnig which periods the first resistance is by-passed and the full input voltage is imposed across said fourth resistance for increasing the temperature thereof toward a first predetermined value under the control of said bridge circuit.

5. A temperature controller comprising a bridge circuit having first, second, third and fourth resistances, said resistances having the ends thereof connected to form first, second, third and fourth junctions, said fourth resistance serving as a heating element having a positive temperature coefficient of resistance, said first and third junctions adapted to be connected across a source of A.C. voltage, said bridge circuit establishing a control voltage across said second and fourth junctions in accordance with the resistance value of said fourth resistance, a silicon-controlled rectifier having input and output terminals thereof connected to said first and fourth junctions respectively, said rectifier further including a gate terminal connected to said second junction for controlling current flow through the input and output terminals thereof in accordance with the control voltage across said second and fourth terminals as established by the value of said fourth resistance, said rectifier conducting current during only a portion of the cycle of the A.C. input voltage across said bridge circuit as determined by the control voltage across said second and fourth junctions during which periods the first resistance is by-passed and the full input voltage is imposed across said fourth resistance for increasing the temperature thereof toward a first predetermined value under the control of said bridge circuit.

6. A temperature controller comprising a bridge circuit having first, second, third and fourth resistances, said resistances having the ends thereof connected to form first, second, third and fourth junctions, said fourth resistance serving as a heating element having a positive temperature coefficient of resistance, said first and third junctions adapted to be connected across a source of A.C. voltage, said bridge circuit establishing a control voltage across said second and fourth junctions in accordance with the resistance value of said fourth resistance, semi-conductor means connected across said second and fourth junctions actuatable in response to said control voltage, said semi-conductor means conducting current during only a portion of the cycle of the A.C. input voltage across said bridge circuit as determined by the control voltage across said second and fourth junctions during which periods the first resistance is by-passed and the full input voltage is imposed across said fourth resistance for increasing the temperature thereof to a first predetermined value under the control of said bridge circuit, and means for varying the voltage at said second junction to change the current conducting period of said semi-conductor means to thereby change the controlled temperature of said fourth resistance.

7. A temperature controller comprising a bridge circuit having a first arm including a first resistance, a second arm including a second resistance, one end of said first arm connected to one end of said second arm at a first junction, a third arm including a third resistance, one end of said third arm being connected to another end of said second arm at a second junction, a fourth arm including a resistance element having a positive temperature coefficient of resistance, one end of said fourth arm being connected to another end of said third arm at a third junction, another end of said fourth arm being connected to another end of said first arm at a fourth junction, means for imposing a source of A.C. power across said first and third junctions, a semi-conductor element having first, second and third terminals, said first terminal connected to said first junction, said second terminal connected to said fourth junction, said third terminal connected to said second junction, said bridge circuit establishing a variable voltage differential across said second and fourth junctions in accordance with the value of said fourth resistance element for controlling current flow through said first and second terminals of said semi-conductor element for by-passing said fourth resistance to cause the input voltage to be impressed across said fourth resistance, said semi-conductor element by-passing said first resistance during only one phase of the A.C. cycle across said first and third junctions for increasing the resistance of said fourth resistance to a predetermined value, said bridge circuit responding to the increased value of resistance in said fourth resistance for reducing the voltage differential across said second and fourth junctions for reducing the period in which said semi-conductor element by-passes said first resistance for maintaining said fourth resistance at said predetermined value.

8. A temperature controller comprising, a bridge sensing circuit having a plurality of resistance elements having the ends thereof connected at a pair of input junctions and a pair of output junctions, one of said resistances serving as a heating element with a positive temperature coefficient of resistance, power circuit means including said one of said resistances serving as a heating element and semiconductor means connected across one of said input and one of said output junctions for directly supplying power through said one of said resistances serving as a heating element to the other of said input junctions, said plurality of resistances of said bridge circuit producing an output signal corresponding to the resistance change of said one of said resistances serving as a heating element, said semiconductor means being responsive to said output signal for varying the energization of said one of said resistances serving as a heating element through said power circuit means in response to change in the temperature of said one of said resistances serving as a heating element.

References Cited by the Examiner
UNITED STATES PATENTS

| | | | |
|---|---|---|---|
| 2,522,753 | 9/50 | Drobisch | 219—212 |
| 2,616,020 | 10/52 | Fay et al. | 219—499 |
| 2,866,067 | 12/58 | Dolan et al. | 219—499 |
| 2,918,558 | 12/59 | Evans | 219—499 |
| 3,050,611 | 8/62 | Kamide | 219—480 |
| 3,136,877 | 6/64 | Heller | 219—501 |
| 3,149,224 | 9/64 | Horne et al. | 219—501 |

RICHARD M. WOOD, *Primary Examiner.*